(12) United States Patent
Huang

(10) Patent No.: US 6,604,757 B1
(45) Date of Patent: Aug. 12, 2003

(54) STEERING CONTROL DEVICE OF THE FRONT WHEELS OF A BEACH MOTORIZED VEHICLE

(75) Inventor: Shu-Fang Huang, Taipei (TW)

(73) Assignee: Taiwan ATV Industrial Co., Ltd., Taipei (TW)

( * ) Notice: Subject to any disclaimer, the term of this patent is extended or adjusted under 35 U.S.C. 154(b) by 0 days.

(21) Appl. No.: 10/122,821

(22) Filed: Apr. 15, 2002

(51) Int. Cl.7 .................................................. B62D 1/12
(52) U.S. Cl. ..................................... 280/778; 280/93.51
(58) Field of Search ................................ 280/778, 779, 280/771, 93.502, 93.51

(56) References Cited

U.S. PATENT DOCUMENTS 4,518,170 A    5/1985   Musgrove .............. 280/93.513
4,600,216 A    7/1986   Burkholder .................. 280/62
6,481,731 B2  11/2002   McHale ................. 280/93.511

Primary Examiner—Paul N. Dickson
Assistant Examiner—Faye M. Fleming
(74) Attorney, Agent, or Firm—Alan D. Kamrath; Rider Bennett, LLP

(57) ABSTRACT

A steering control device of the front wheels of a beach motorized vehicle includes a swing arm pivoted on a horizontal rack of the beach motorized vehicle. The swing arm has two ends each pivotally connected with a linking lever which is pivotally connected with each of the two steering levers. Each of the two drive bars has a first end pivotally connected to each of the two ends of the swing arm, and a second end pivotally connected with an L-shaped control plate. When each of the two steering levers is moved, the swing arm may be pivoted to move each of the two drive bars to simultaneously move and pivot the L-shaped control plate so as to drive and turn each of the two front wheels.

1 Claim, 13 Drawing Sheets

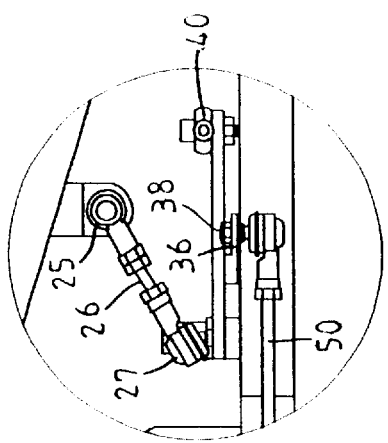
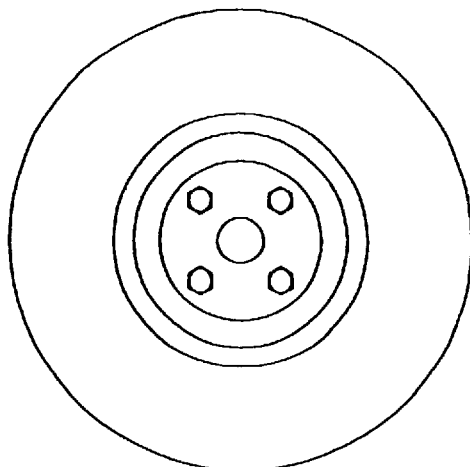
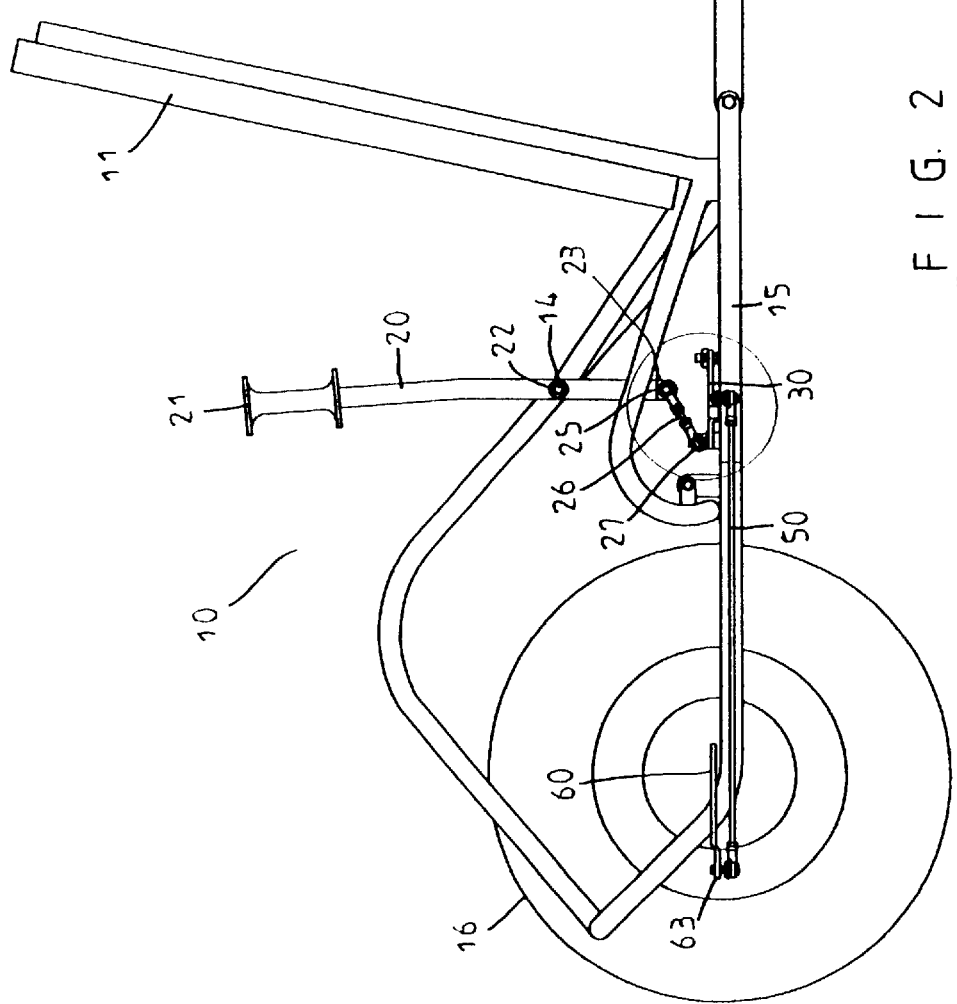
FIG. 2A PRIOR ART
FIG. 2 PRIOR ART

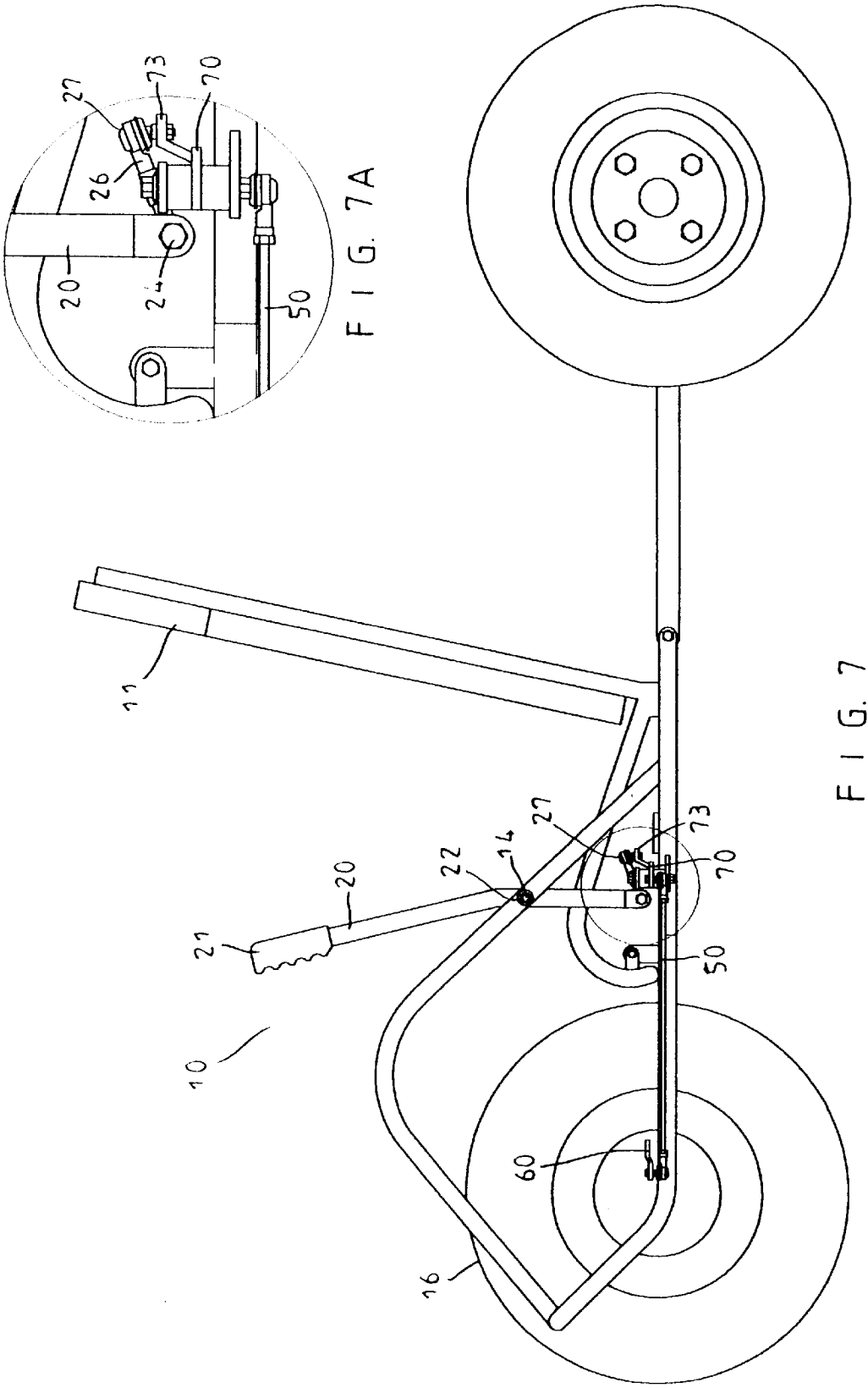

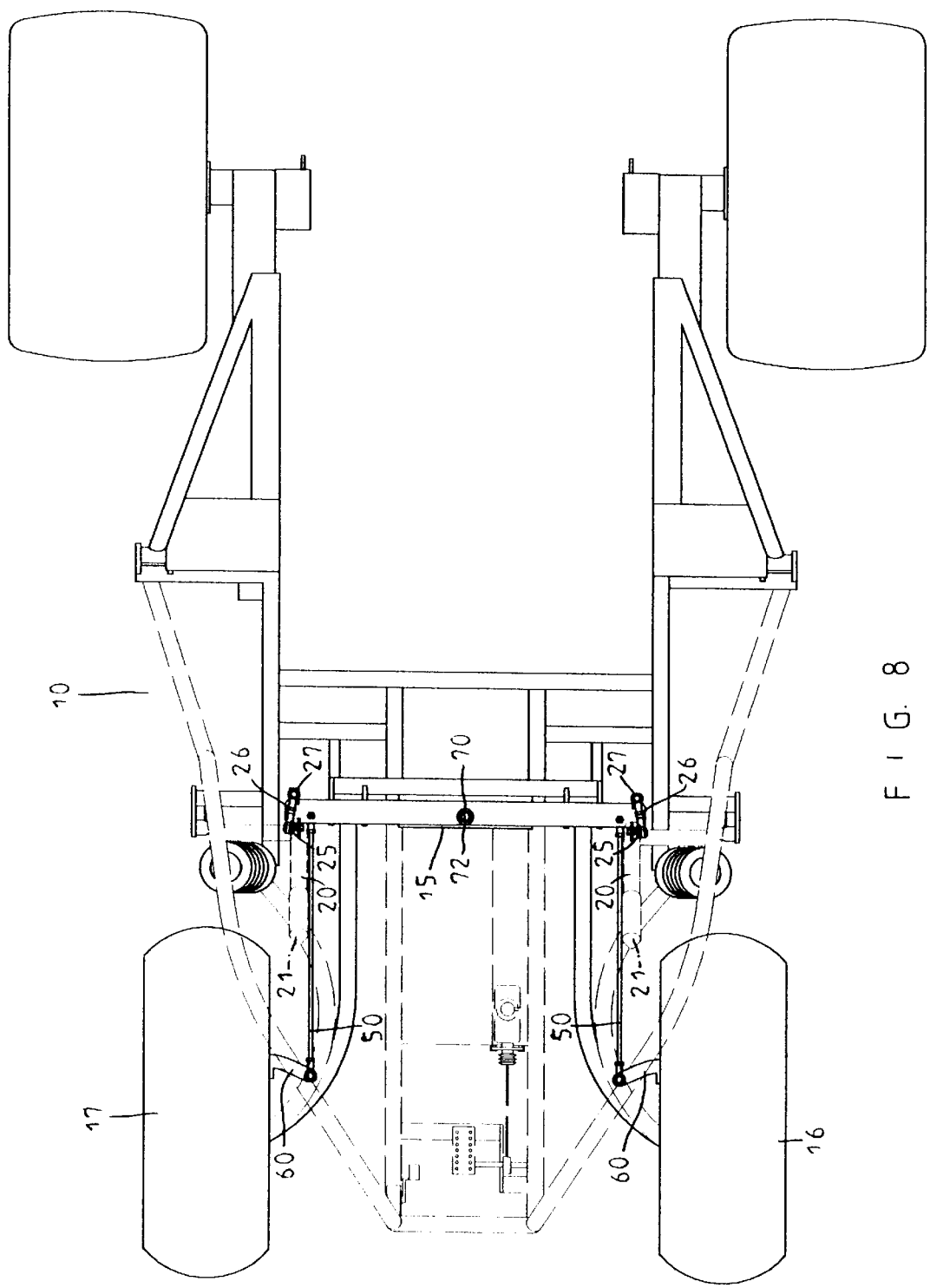
F I G. 8

STEERING CONTROL DEVICE OF THE FRONT WHEELS OF A BEACH MOTORIZED VEHICLE

BACKGROUND OF THE INVENTION

1. Field of the Invention

The present invention relates to a steering control device of the front wheels of a beach motorized vehicle, and more particularly to a steering control device of the front wheels of a beach motorized vehicle, wherein the rotation moment produced by the swing arm may balance the forces of the left steering levers, thereby saving time and the manual work in operation of the steering levers, and thereby facilitating the user steering and operating the beach motorized vehicle.

2. Description of the Related Art

A conventional steering control device of the front wheels of a beach motorized vehicle in accordance with the prior art is shown in FIGS. 1–5.

The steering seat 11 of the beach motorized vehicle 10 has two sides each provided with an upright frame 12, and two steering levers 20 each pivotally mounted on the upright frame 12 by a pivot member 14. Each of the two steering levers 20 has a top provided with a handle 21, a mediate portion formed with pivot hole 22 for passage of the pivot member 14, and a bottom formed with a pivot hole 23. The pivot hole 22 at the mediate portion of each of the two steering levers 20 is located adjacent to the bottom, so that each of the two steering levers 20 may have a longer arm of applying force, thereby saving energy in operation. The pivot hole 23 at the bottom of each of the two steering levers 20 is pivoted with a universal connector 25 by a nut 24. The universal connector 25 is provided with a linking lever 26 which is connected to another universal connector 27. The universal connector 27 is pivotally mounted on a pivot hole 31 formed in a rotation plate 30. The rotation plate 30 has a periphery formed with the pivot hole 31, a pivot hole 32 and a pivot hole 33. The pivot hole 33 of the rotation plate 30 is pivoted on the horizontal rack 15 of the beach motorized vehicle 10 by a pivot member 34. The pivot hole 32 of the rotation plate 30 is pivoted with a pull bar 40 by a pivot member 35. The pull bar 40 has two ends each pivoted with one of the two rotation plates 30. The bottom of the rotation plate 30 is provided with a pivot plate 36 which is formed with a pivot hole 37. The pivot hole 37 of the pivot plate 36 of the rotation plate 30 is pivoted with a drive bar 50. The drive bar 50 is extended forward to each of the two front wheels 16 and 17. Each of the two front wheels 16 and 17 is controlled by an L-shaped control plate 60. The control plate 60 is mounted between the drive bar 50 and each of the two front wheels 16 and 17. The control plate 60 is formed with a pivot hole 63 pivoted on the drive bar 50. Thus, the drive bar 50 may be pushed forward and may be pulled rearward, to drive the L-shaped control plate 60 which may drive the two front wheels 16 and 17 to turn leftward as shown in FIG. 4 or turn rightward as shown in FIG. 5.

However, the conventional steering control device of the front wheels of a beach motorized vehicle in accordance with the prior art has the following disadvantages.

1. The left-sided and right-sided rotation plates 30 are connected by the pull bar 40. When the left-sided and right-sided steering levers 20 are moved to drive the left-sided and right-sided rotation plates 30 to rotate, the left-sided and right-sided rotation plates 30 are rotated in the same direction. Thus, it is necessary to directly pull and push the pull bar 60, thereby consuming much time and manual work in operation.

2. The conventional steering control device consists of many parts including the left-sided and right-sided steering levers 20, the universal connectors 25 and 27, the linking levers 26, the left-sided and right-sided rotation plates 30, the pull bar 40, the drive bars 50, and the L-shaped control plates 60, thereby complicating the construction of the conventional steering control device, and thereby increasing the costs of fabrication and maintenance.

SUMMARY OF THE INVENTION

The present invention has arisen to mitigate and/or obviate the disadvantage of the conventional steering control device of the front wheels of a beach motorized vehicle.

The primary objective of the present invention is to provide a steering control device of the front wheels of a beach motorized vehicle, wherein the steering control device in accordance with the present invention uses a swing arm to replace the left-sided and right-sided rotation plates and the pull bar of the conventional steering control device. The rotation moment produced by the swing arm may balance the forces of the left-sided and right-sided steering levers, thereby saving time and the manual work in operation of the steering levers, and thereby facilitating the user steering and operating the beach motorized vehicle.

Another objective of the present invention is to provide a steering control device of the front wheels of a beach motorized vehicle, wherein the steering control device in accordance with the present invention uses a swing arm to replace the left-sided and right-sided rotation plates and the pull bar of the conventional steering control device, thereby reducing the composed parts and simplifying the construction, and thereby decreasing the costs of fabrication and maintenance.

In accordance with the present invention, there is provided a steering control device of the front wheels of a beach motorized vehicle, the beach motorized vehicle including a steering seat which has two sides each provided with an upright frame, two steering levers each pivotally mounted on the upright frame and each having a lower end pivoted with a first end of a linking lever by a first universal connector, and two front wheels each driven to turn by pivoting of an L-shaped control plate, wherein:

the steering control device includes a swing arm which crosses the beach motorized vehicle, the swing arm has a center formed with a pivot hole, so that the swing arm may be pivoted on a horizontal rack of the beach motorized vehicle by a pivot member, the swing arm has two ends each provided with a pivot plate which is formed with a pivot hole, a second universal connector is pivotally mounted on the pivot hole of the pivot plate of each of the two ends of the swing arm by a nut, and is mounted on a second end of the linking lever, each of the two ends of the swing arm is provided with a pivot hole which is located opposite to each of the two front wheels, two drive bars each having a first end pivotally connected to the pivot hole of each of the two ends of the swing arm by a pivot member and a nut, and each having a second end extended forward to the L-shaped control plate of each of the two front wheels; and wherein:

when each of the two steering levers is moved, the swing arm may be pivoted to move each of the two drive bars to simultaneously move and pivot the L-shaped control plate so as to turn each of the two front wheels.

Further benefits and advantages of the present invention will become apparent after a careful reading of the detailed description with appropriate reference to the accompanying drawings.

BRIEF DESCRIPTION OF THE DRAWINGS

FIG. 2 is a front plan view of the conventional steering control device of the front wheels of a beach motorized vehicle as shown in FIG. 1;

FIG. 2A is a partially cut-away view of the conventional steering control device of the front wheels of a beach motorized vehicle as shown in FIG. 2;

FIG. 7 is a front plan view of the steering control device of the front wheels of a beach motorized vehicle as shown in FIG. 6;

FIG. 7A is a partially cut-away view of the steering control device of the front wheels of a beach motorized vehicle as shown in FIG. 7;

FIG. 8 is a top plan view of the conventional steering control device of the front wheels of a beach motorized vehicle as shown in FIG. 6;

DETAILED DESCRIPTION OF THE INVENTION

Figure 1:
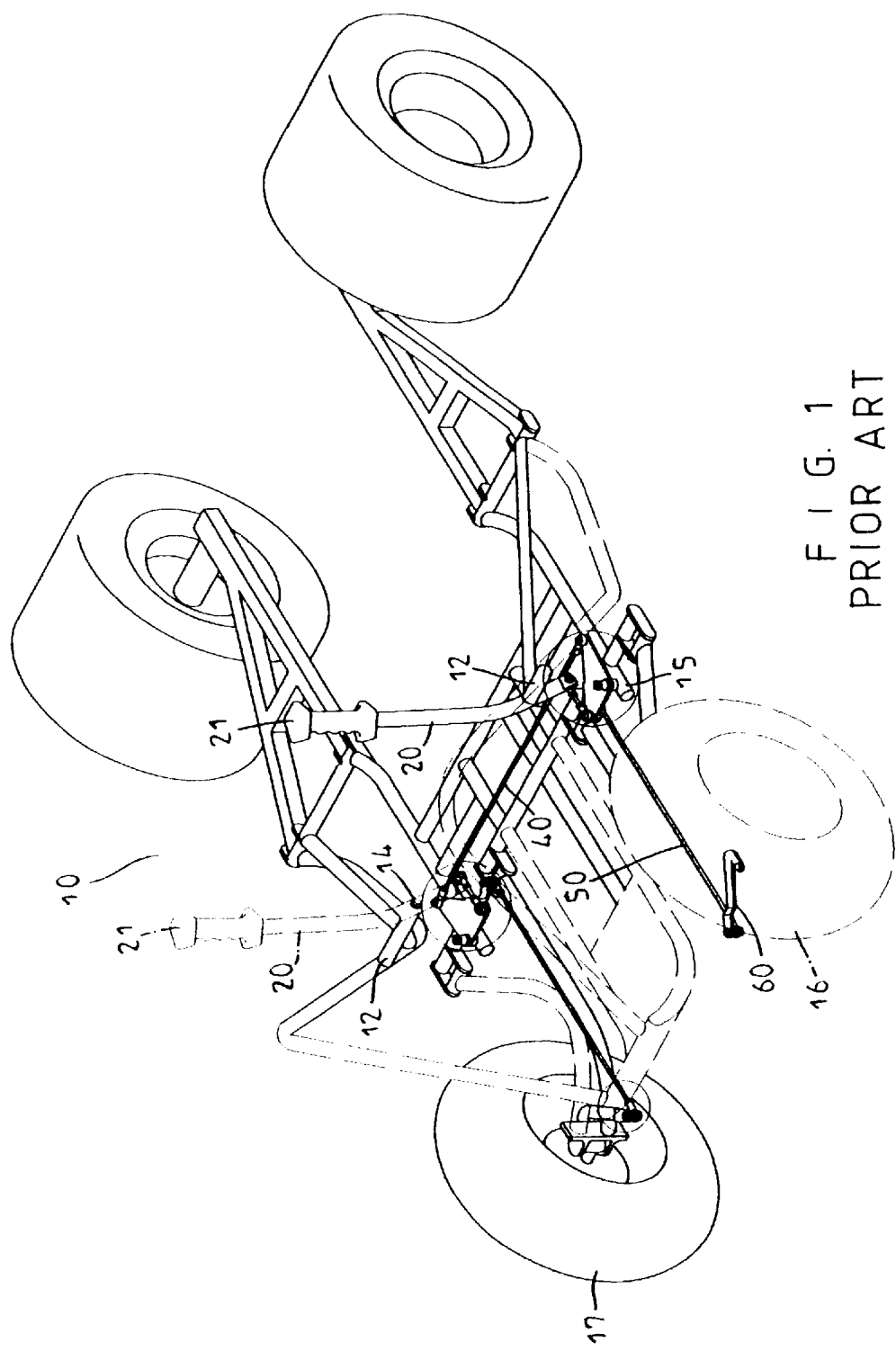
FIG. 1 is a perspective view of a conventional steering control device of the front wheels of a beach motorized vehicle in accordance with the prior art.
Figures 1A, 1B, 1C:
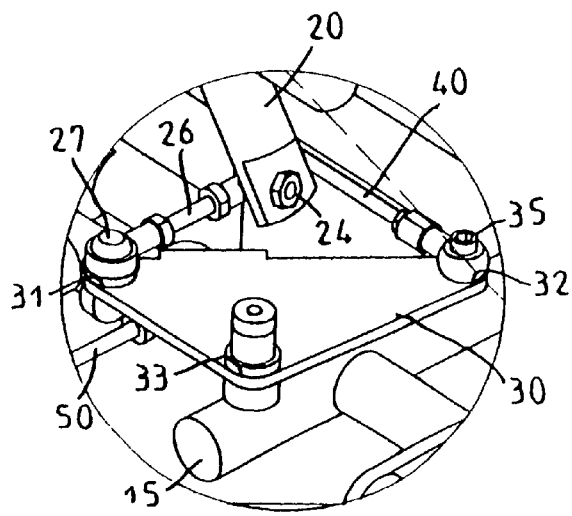
FIG. 1A is a partially cut-away view of the conventional steering control device of the front wheels of a beach motorized vehicle as shown in FIG. 1.
FIG. 1B is a partially cut-away view of the conventional steering control device of the front wheels of a beach motorized vehicle as shown in FIG. 1.
FIG. 1C is a partially cut-away view of the conventional steering control device of the front wheels of a beach motorized vehicle as shown in FIG. 1.
Figure 3:
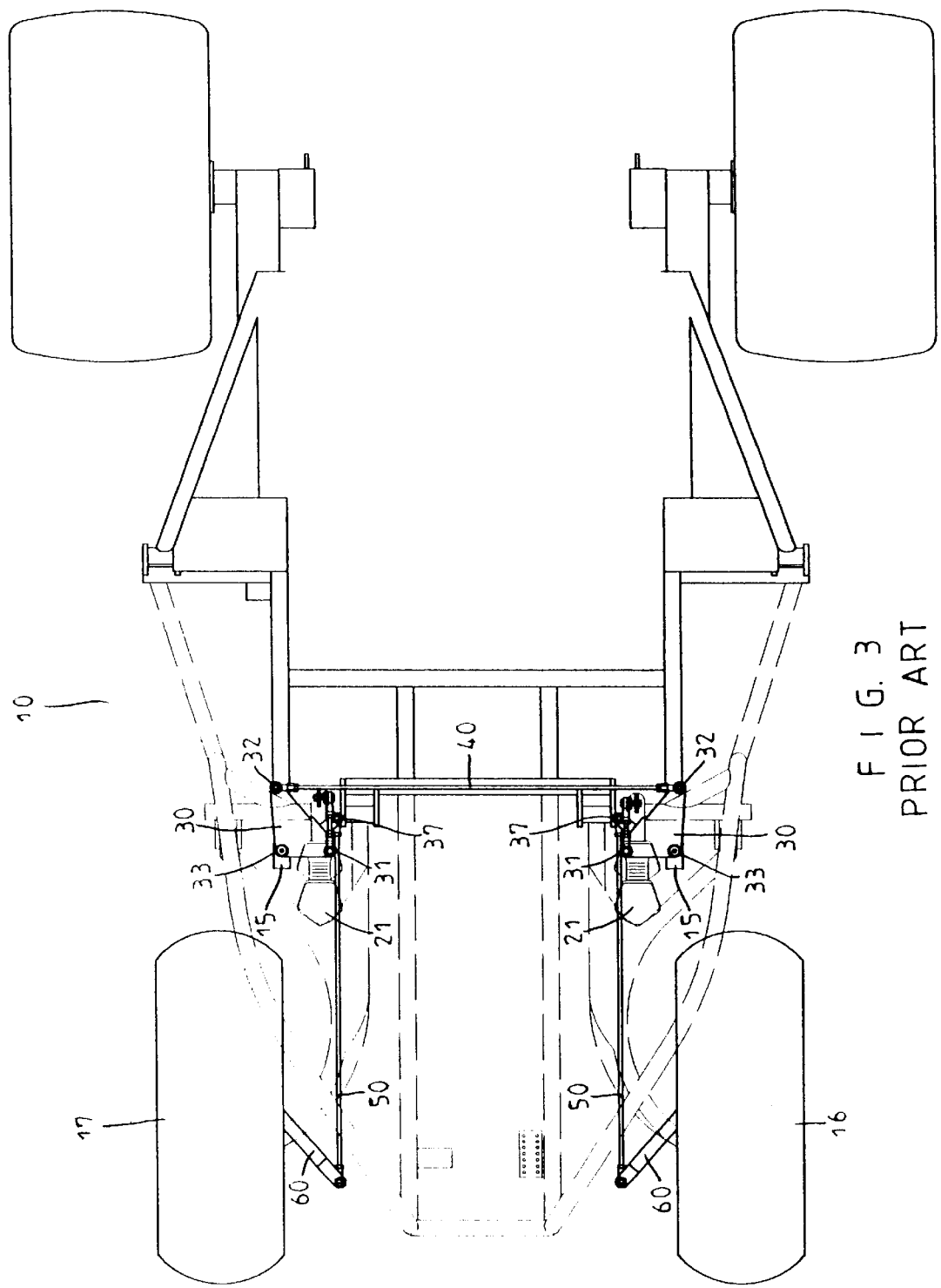
FIG. 3 is a top plan view of the conventional steering control device of the front wheels of a beach motorized vehicle as shown in FIG. 1.
Figure 4:
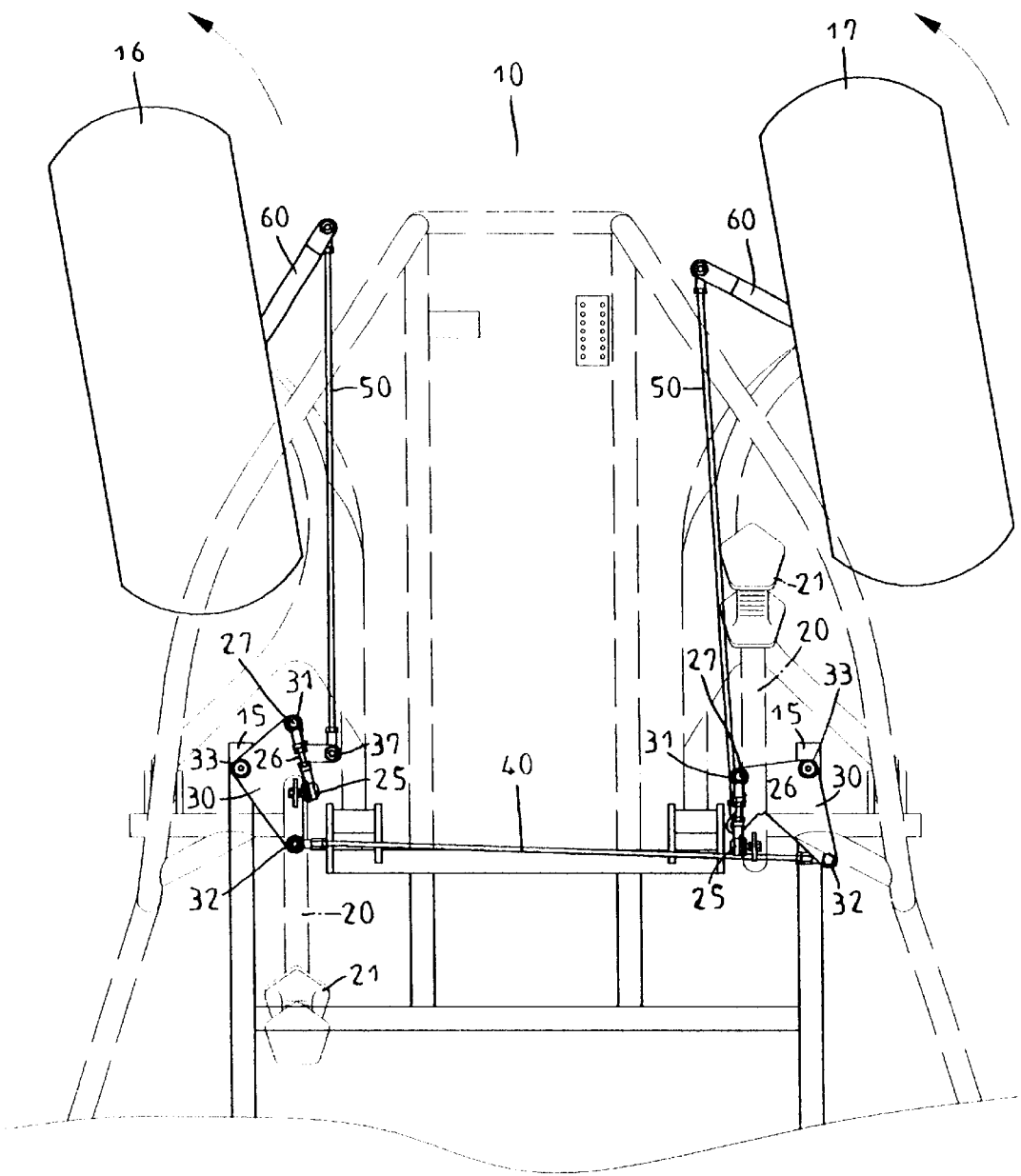
FIG. 4 is a schematic operation view of the conventional steering control device of the front wheels of a beach motorized vehicle as shown in FIG. 3.
Figure 5:
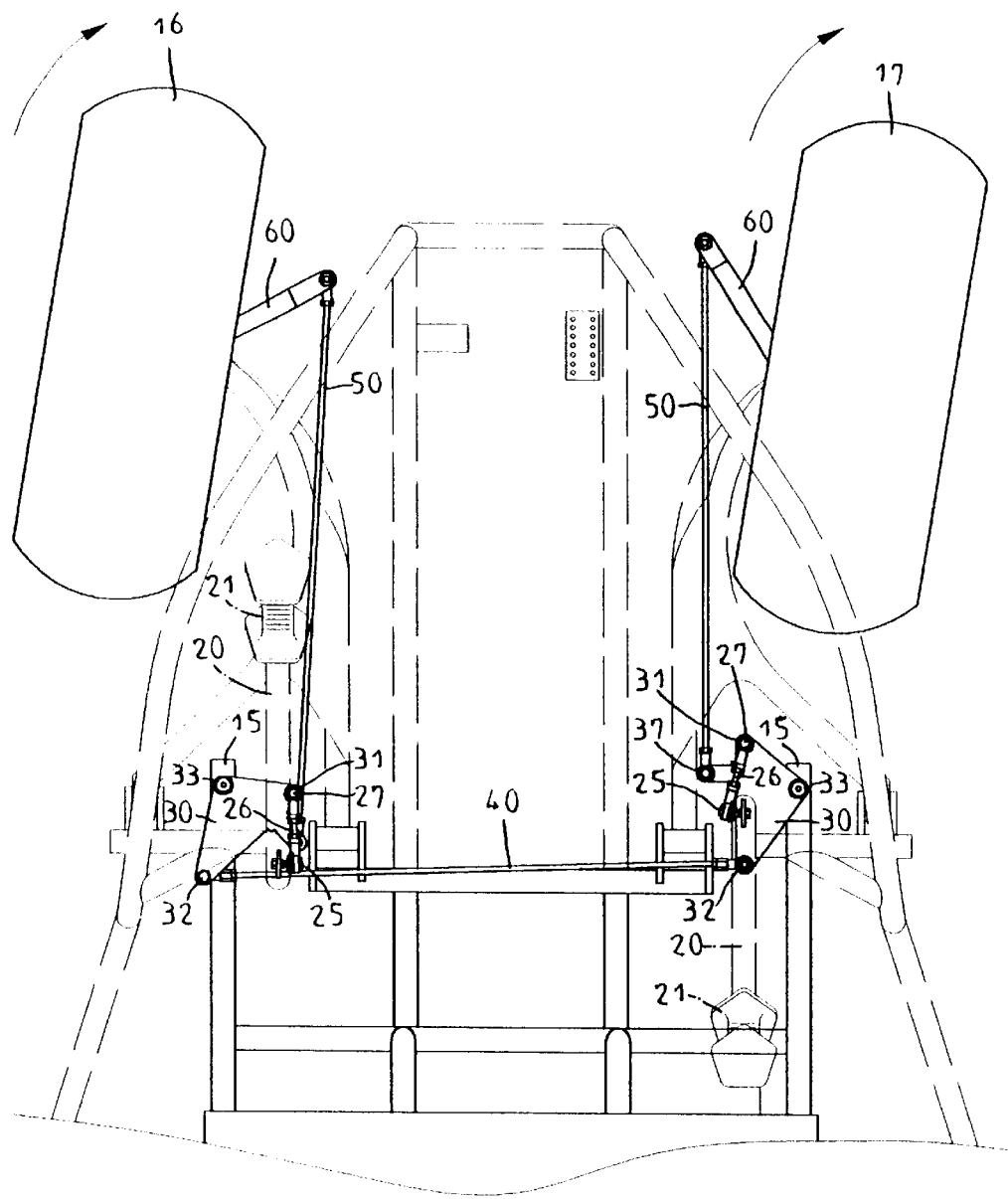
FIG. 5 is a schematic operational view of the conventional steering control device of the front wheels of a beach motorized vehicle as shown in FIG. 3.
Figure 6:
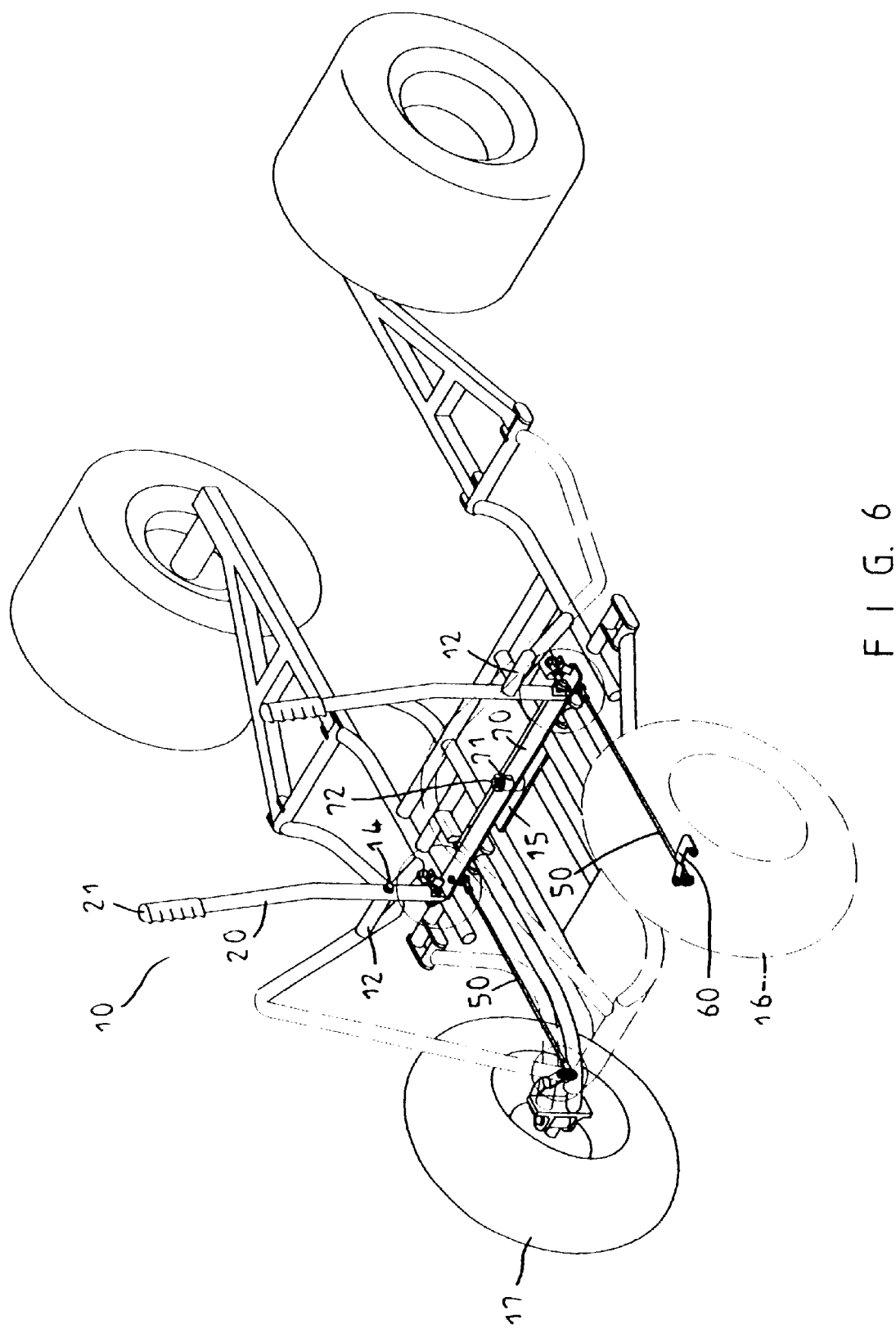
FIG. 6 is a perspective view of a steering control device of the front wheels of a beach motorized vehicle in accordance with a preferred embodiment of the present invention.
Figure 6A:
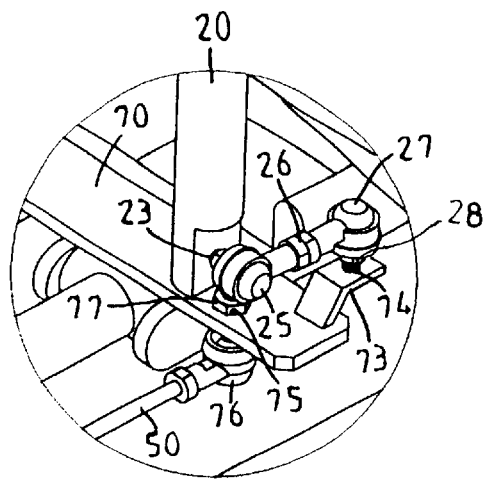
FIG. 6A is a partially cut-away view of the steering control device of the front wheels of a beach motorized vehicle as shown in FIG. 6.
Figure 6B:
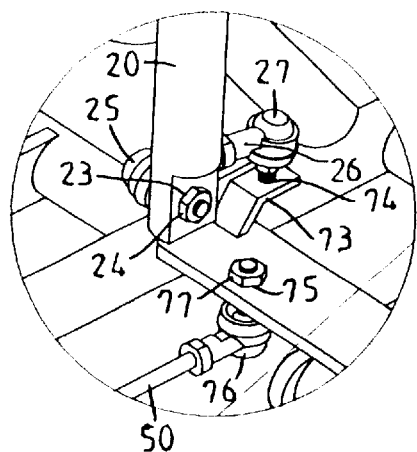
FIG. 6B is a partially cut-away view of the steering control device of the front wheels of a beach motorized vehicle as shown in FIG. 6.
Figure 6C:
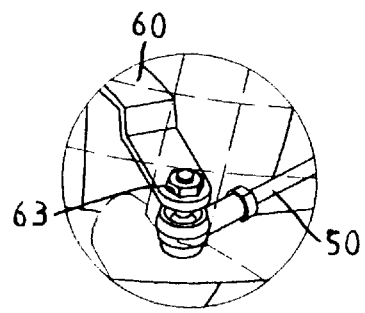
FIG. 6C is a partially cut-away view of the steering control device of the front wheels of a beach motorized vehicle as shown in FIG. 6.

Referring to the drawings and initially to FIGS. 6–8, a steering control device of the front wheels of a beach motorized vehicle in accordance with a preferred embodiment of the present invention is shown.

Most of the parts of the steering control device of the front wheels of a beach motorized vehicle in accordance with a preferred embodiment of the present invention are the same as that of the conventional steering control device of the front wheels of a beach motorized vehicle in accordance with the prior art as shown in FIGS. 1–5, and will not be further described in detail, wherein the same reference number indicates the same part throughout the entire specification.

The same parts of the steering control device of the front wheels of a each motorized vehicle in accordance with a preferred embodiment of the present invention are the same as that of the conventional steering control device of the front wheels of a beach motorized vehicle in accordance with the prior art as shown in FIGS. 1–5 include: the left-sided and right-sided steering levers 20, the universal connectors 25 and 27, the linking levers 26, the left-sided and right-sided drive bars 50, and the L-shaped control plates 60.

The steering control device of the front wheels of a beach motorized vehicle in accordance with a preferred embodiment of the present invention uses a swing arm 70 to replace the left-sided and right-sided rotation plates 30 and the pull bar 40 of the conventional steering control device of the front wheels of a beach motorized vehicle in accordance with the prior art as shown in FIGS. 1–5.

Referring to FIGS. 6–8, the swing arm 70 crosses the beach motorized vehicle 10. The swing arm 70 has a center formed with a pivot hole 71, so that the swing arm 70 may be pivoted on the horizontal rack 15 of the beach motorized vehicle 10 by a pivot member 72. Thus, the swing arm 70 may be pivoted on the horizontal rack 15 of the beach motorized vehicle 10 clockwise or counterclockwise. The swing arm 70 has two ends each provided with a pivot plate 73 which is formed with a pivot hole 74, so that the universal connector 27 may be pivotally mounted on the pivot hole 74 of the pivot plate 73 of the swing arm 70 by a nut 28. Each of the two ends of the swing arm 70 is provided with a pivot hole 75 which is located opposite to each of the two front wheels 16 and 17. Each of the left-sided and right-sided drive bars 50 is pivotally connected to the pivot hole 75 of each of the two ends of the swing arm 70 by a pivot member 76 and a nut 77, and is extended forward to each of the L-shaped control plates 60 of the two front wheels 16 and 17.

Figure 9:
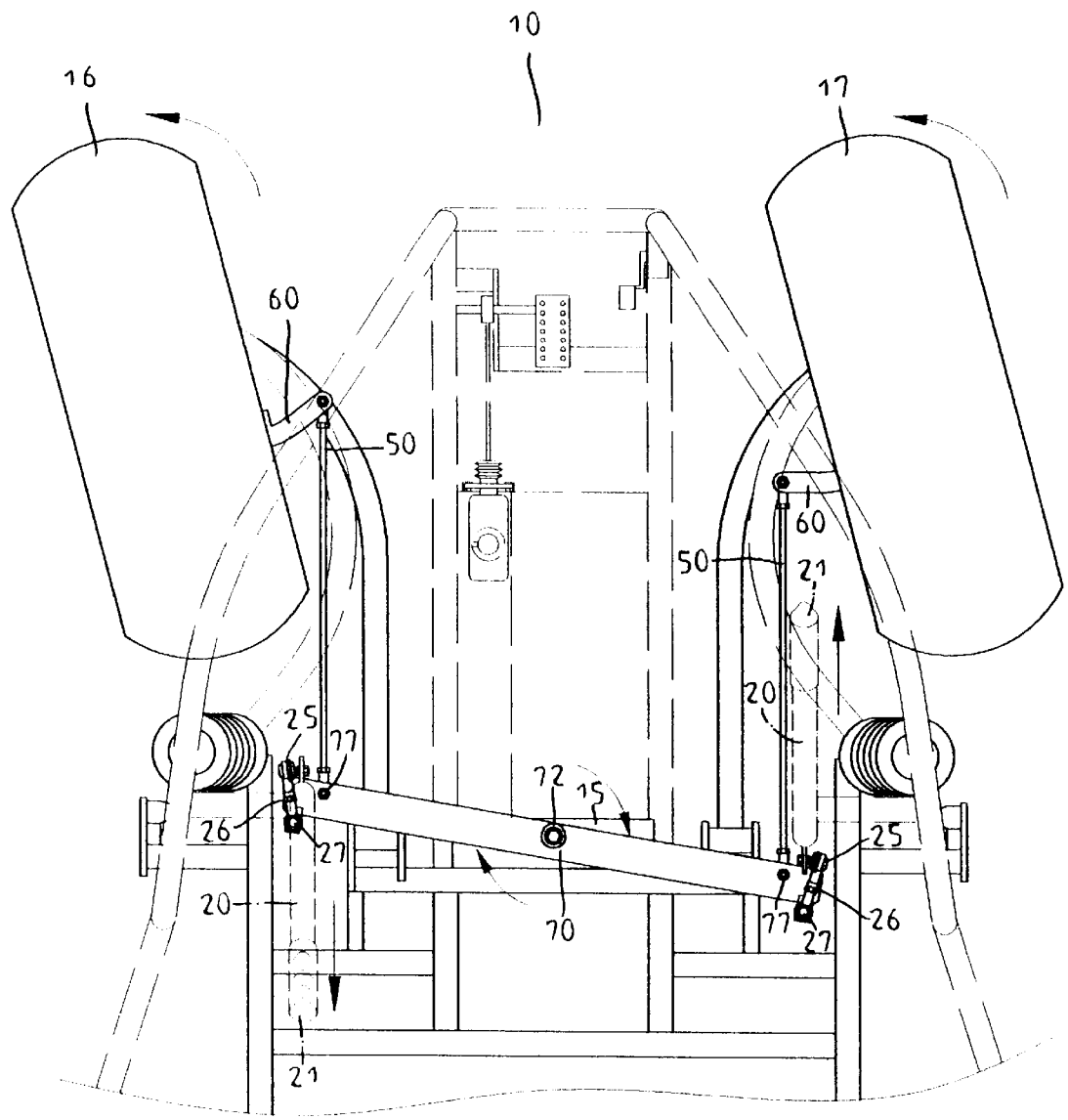
FIG. 9 is a schematic operation view of the conventional steering control device of the front wheels of a beach motorized vehicle as shown in FIG. 8.
Figure 10:
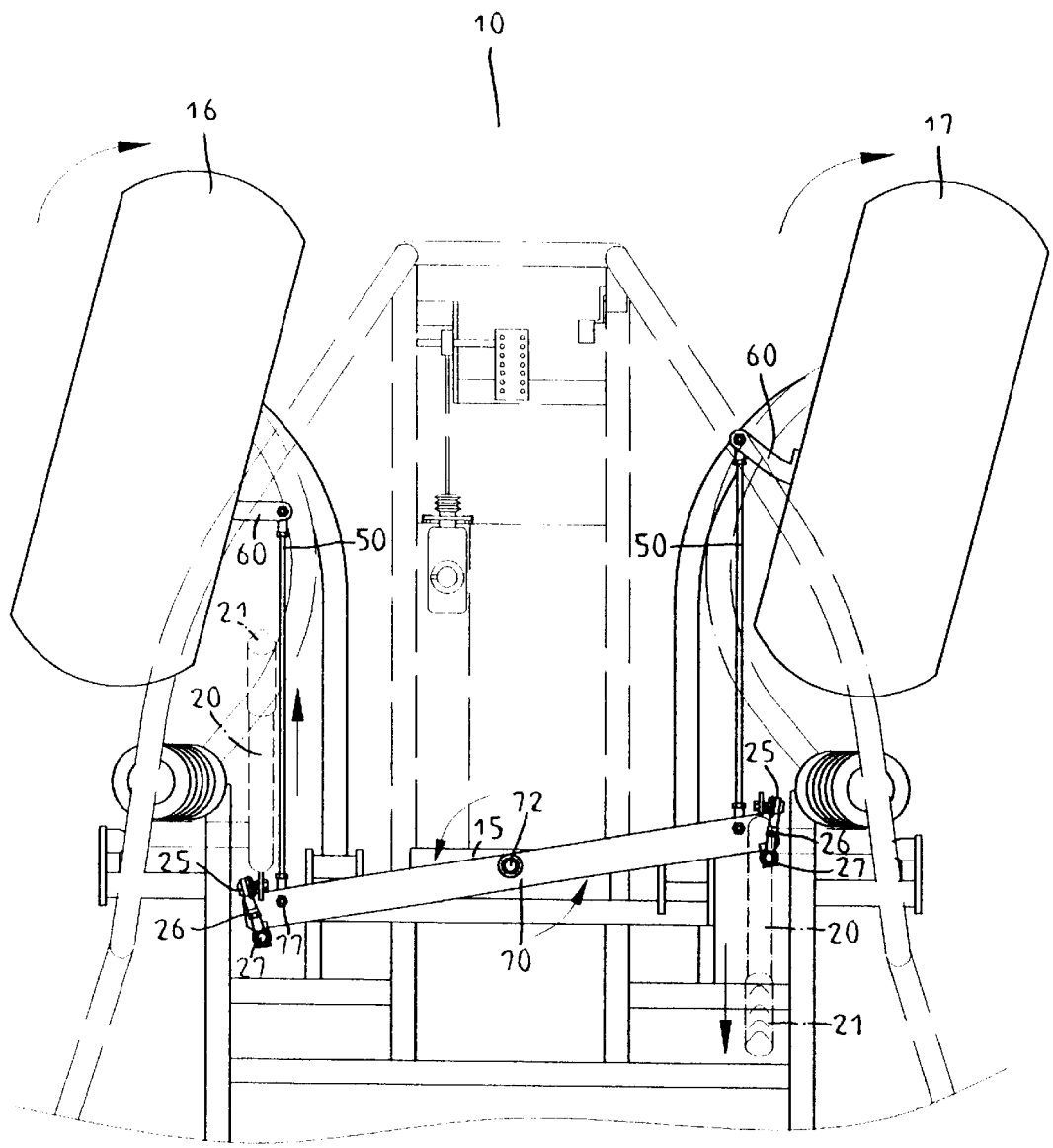
FIG. 10 is a schematic operation view of the conventional steering control device of the front wheels of a beach motorized vehicle as shown in FIG. 8.
Figure 12:
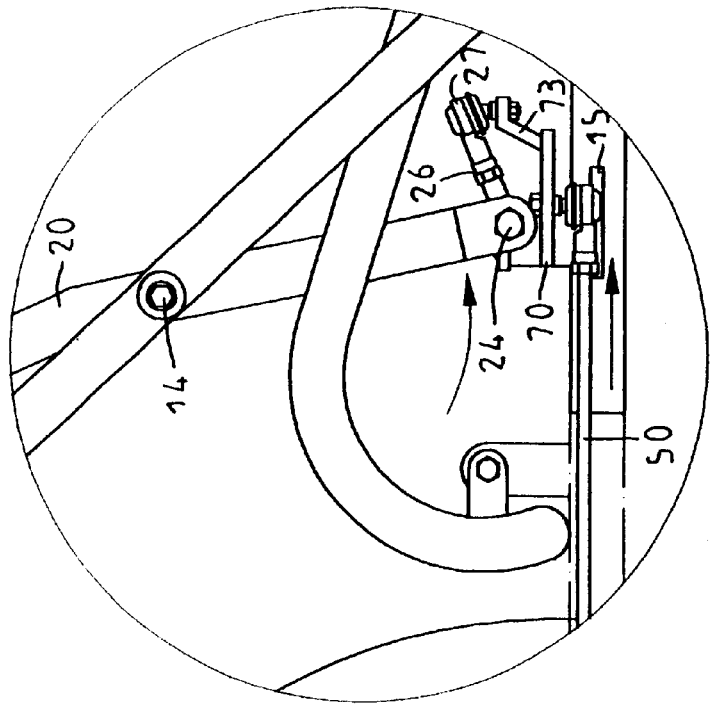
FIG. 12 is a partially cut-away operational view of the steering control device of the front wheels of a beach motorized vehicle as shown in FIG. 7.
Figure 11:
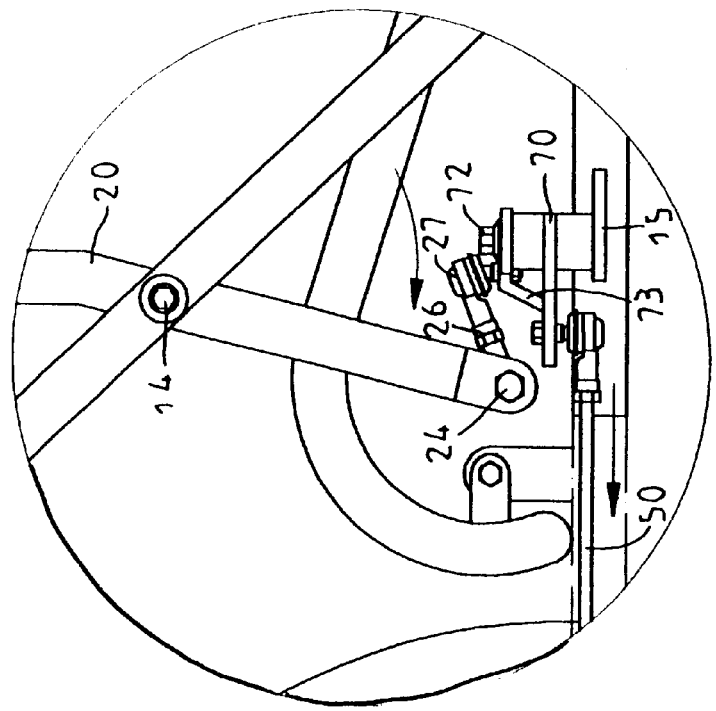
FIG. 11 is a partially cut-away operational view of the steering control device of the front wheels of a beach motorized vehicle as shown in FIG. 7.

Referring to FIGS. 9–12 with reference to FIGS. 6–8, when the right-sided steering lever 20 is pushed forward as shown in FIGS. 9 and 12, and the left-sided steering lever 20 is pulled backward as shown in FIGS. 9 and 11, the linking lever 26 connected between the universal connectors 25 and 27 is moved by the steering lever 20 to move the pivot plate 73 of each of the two ends of the swing arm 70, so that the swing arm 70 may be rotated clockwise. Thus, the right-sided drive bar 50 may be pulled backward, and the left-sided drive bar 50 may be pushed forward, thereby pivoting the L-shaped control plates 60, so that the two front wheels 16 and 17 may be driven to turn left simultaneously.

Alternatively, when the right-sided steering lever 20 is pulled backward as shown in FIGS. 9 and 11, and the left-sided steering lever 20 is pushed forward as shown in FIGS. 9 and 12, the linking lever 26 connected between the universal connectors 25 and 27 is moved by the steering lever 20 to move the pivot plate 73 of each of the two ends of the swing arm 70, so that the swing arm 70 may be rotated counterclockwise. Thus, the right-sided drive bar 50 may be pushed forward, and the left-sided drive bar 50 may be pulled backward, thereby pivoting the L-shaped control plates 60, so that the two front wheels 16 and 17 may be driven to turn right simultaneously.

Accordingly, the steering control device of the front wheels of a beach motorized vehicle in accordance with the preferred embodiment of the present invention has the following advantages.

1. The steering control device in accordance with the present invention uses a swing arm 70 to replace the left-sided and right-sided rotation plates 30 and the pull bar 40 of the conventional steering control device. The rotation moment produced by the swing arm 70 may balance the forces of the left-sided and right-sided steering levers 20, thereby saving time and the manual work in operation of the steering levers 20, and thereby facilitating the user steering and operating the beach motorized vehicle.

2. The steering control device in accordance with the present invention uses a swing arm 70 to replace the left-sided and right-sided rotation plates 30 and the pull bar 40 of the conventional steering control device, thereby reducing the composed parts and simplifying the construction, and thereby decreasing the costs of fabrication and maintenance.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A steering control device of the front wheels of a beach motorized vehicle, the beach motorized vehicle including a steering seat which has two sides each provided with an upright frame, two steering levers each pivotally mounted on the upright frame and each having a lower end pivoted with a first end of a linking lever by a first universal connector, and two front wheels each driven to turn by pivoting of an L-shaped control plate, wherein:

the steering control device includes a swing arm which crosses the beach motorized vehicle, the swing arm has a center formed with a pivot hole, so that the swing arm may be pivoted on a horizontal rack of the beach motorized vehicle by a pivot member, the swing arm has two ends each provided with a pivot plate which is formed with a pivot hole, a second universal connector is pivotally mounted on the pivot hole of the pivot plate of each of the two ends of the swing arm by a nut, and is mounted on a second end of the linking lever, each of the two ends of the swing arm is provided with a pivot hole which is located opposite to each of the two front wheels, two drive bars each having a first end pivotally connected to the pivot hole of each of the two ends of the swing arm by a pivot member and a nut, and each having a second end extended forward to the L-shaped control plate of each of the two front wheels; and wherein:

when each of the two steering levers is moved, the swing arm may be pivoted to move each of the two drive bars to simultaneously move and pivot the L-shaped control plate so as to turn each of the two front wheels.

\* \* \* \* \*